(12) United States Patent
Jiang et al.

(10) Patent No.: US 11,108,115 B2
(45) Date of Patent: Aug. 31, 2021

(54) BATTERY CASE AND BATTERY MODULE

(71) Applicant: CONTEMPORARY AMPEREX TECHNOLOGY CO., LIMITED, Fujian (CN)

(72) Inventors: Liwen Jiang, Fujian (CN); Tingting Zhu, Fujian (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 0 days.

(21) Appl. No.: 17/139,980

(22) Filed: Dec. 31, 2020

(65) Prior Publication Data

US 2021/0126318 A1 Apr. 29, 2021

Related U.S. Application Data

(63) Continuation of application No. PCT/CN2019/075821, filed on Feb. 22, 2019.

(30) Foreign Application Priority Data

Dec. 29, 2018 (CN) .......................... 201822254181.7

(51) Int. Cl.
*H01M 50/271* (2021.01)
*H01M 50/262* (2021.01)
*H01M 50/238* (2021.01)

(52) U.S. Cl.
CPC ....... *H01M 50/271* (2021.01); *H01M 50/238* (2021.01); *H01M 50/262* (2021.01)

(58) Field of Classification Search
CPC .. B65D 11/18; B65D 11/1833; B65D 21/086; H01M 50/238; H01M 50/242;
(Continued)

(56) References Cited

U.S. PATENT DOCUMENTS 3,146,132 A * 8/1964 Nathan ................. H01M 50/20
429/100
3,207,357 A * 9/1965 Schmitt .................. B65D 5/241
220/62

(Continued)

FOREIGN PATENT DOCUMENTS

CN 103765629 A 4/2014
CN 204991794 U 1/2016
(Continued)

OTHER PUBLICATIONS

Anzia ("Why clear plastic shoeboxes are a professional organizer's secret weapon"—new article from the Washington Post dated Mar. 1, 2016). (Year: 2016).*

*Primary Examiner* — Gregg Cantelmo
(74) *Attorney, Agent, or Firm* — Scully Scott Murphy & Presser

(57) ABSTRACT

The present application provides a battery case and a battery module. The battery case includes a bottom plate; and a plurality of circumferentially spaced extensions formed by extending horizontally outward along the bottom plate, and each extension is bended at least once to form a case side arm, and a cavity of the battery case is enclosed by the case side arms and the bottom plate, and end faces for connection of the case side arms are bended to form connecting portions, and two adjacent connecting portions are snap-fitted to fix the adjacent case side arms to each other.

15 Claims, 4 Drawing Sheets

(58) Field of Classification Search
CPC ............. H01M 50/249; H01M 50/262; H01M 50/204; H01M 50/224; H01M 50/271; B60L 50/50; B60L 50/64
USPC .......................................................... 220/7
See application file for complete search history.

(56) References Cited

U.S. PATENT DOCUMENTS

| | | |
|---|---|---|
| 10,128,469 B2 | 11/2018 | Hattori et al. |
| 2012/0244422 A1* | 9/2012 | Ushijima ............. H01M 50/20 |
| | | 429/176 |
| 2014/0308555 A1 | 10/2014 | Hattori et al. |
| 2019/0074496 A1* | 3/2019 | Hielscher ............. H01M 50/20 |

FOREIGN PATENT DOCUMENTS

| | | |
|---|---|---|
| CN | 107958972 A | 4/2018 |
| CN | 108183184 A | 6/2018 |

* cited by examiner

BATTERY CASE AND BATTERY MODULE

CROSS-REFERENCE TO RELATED APPLICATIONS

This application is a continuation of International Application No. PCT/CN2019/075821, filed on Feb. 22, 2019, which claims priority to Chinese Patent Application No. 201822254181.7, filed on Dec. 29, 2018. The disclosures of the aforementioned applications are hereby incorporated by reference in their entireties.

TECHNICAL FIELD

The present application relates to the technical field of batteries, in particular to a battery case and a battery module.

BACKGROUND

In recent years, emerging new-energy vehicles have greatly promoted social development and environmental protection, and traction battery packs, which are rechargeable batteries, are the power sources for the new-energy vehicles and are widely applied in the field of new-energy vehicles. In order to guarantee the overall structural strength of the battery packs and realize safe driving of the vehicles, the structural strength of a case of battery modules in the battery packs is particularly important. At present, end plates and side plates of the battery modules are separate parts, and the case of battery modules is generally formed by welding or riveting the end plates and the side plates together to ensure that battery cells can be stably arranged in the case of the battery modules, or to increase the structural strength of the case of the battery modules by increasing the thickness of plates.

Although the cases of the battery modules in the prior art can increase the strength at the joints between the end plates and the side plates to a certain extent, in the prior art, connection of the end plates and the side plates by welding or riveting is cumbersome while expensive welding equipment is also needed and the process is complicated, which influences the production efficiency and increasing the manufacturing costs.

SUMMARY

The present application aims to provide a battery case and a battery module in order to alleviate the technical problem of a cumbersome connection of end plates and side plates of the battery case and thus low production efficiency in the prior art.

In a first aspect, the present application provides a battery case, including:
a bottom plate; and
a plurality of extensions circumferentially spaced formed by extending horizontally outward along the bottom plate,
each of the plurality of extensions is bent at least once to form a case side arm and a cavity of the battery case is enclosed by the case side arms and the bottom plate, and
end faces for connection of the case side arms are bent to form connecting portions, and two adjacent connecting portions are snap-fitted to fix the adjacent case side arms to each other.

Further, the connecting portions include first connecting portions and second connecting portions; and the case side arms includes:
at least two end plates, end faces for connection of the at least two end plates being bent to form the first connecting portions; and
at least two side plates, an end plate being arranged between the adjacent side plates, end faces for connection of the side plates being bent to form the second connecting portions;
adjacent first connecting portion and second connecting portion are snap-fitted together.

Further, the at least two end plates are bent to form at least one reinforcing arm, and the reinforcing arm is arranged parallel to the bottom plate; and
the reinforcing arm is located outside the cavity of the battery case.

Further, the number of the reinforcing arms is two, the first connecting portions and the second connecting portions are snap-fitted to form a support, and the support abuts between two reinforcing arms.

Further, the reinforcing arm includes two reinforcing portions arranged opposite one another, and the two reinforcing portions are both provided with a plurality of first connecting holes corresponding to one another; and
the reinforcing arms are connected to a case of a battery pack by connecting members passing through the first connecting holes.

Further, the side plates are bent to form at least one bent arm, the bent arm is arranged parallel to the bottom plate, and the bent arm is located outside the cavity of the battery case; and
the bent arm is provided with a second connecting hole, and the bent arm is connected to the case of the battery pack by a connecting member passing through the second connecting hole.

Further, the bent arm includes:
two bent portions arranged opposite one another, the two bent portions being both provided with a plurality of second connecting holes corresponding to one another.

Further, the end faces, facing away from the bottom plate, of the side plates extend outward to form pressing members, and the pressing members are located inside the cavity of the battery case.

Further, the battery case includes:
a bottom plate; and
a plurality of circumferentially spaced extensions formed by extending horizontally outward along the bottom plate,
each of the extensions is bent at least once to form a case side arm and a cavity of the battery case is enclosed by the case side arms and the bottom plate, and
end faces for connection of the case side arms are provided with connecting portions, and two adjacent connecting portions are folded over one another to fix the adjacent case side arms to each other.

The present application has the beneficial effects as follows.

The present application provides a battery case including a bottom plate and a plurality of circumferentially spaced extensions, each extension is formed by extending horizontally outward along the bottom plate, particularly each extension is bent at least once to form a case side arm, and a cavity of the battery case are enclosed by the case side arms and the bottom plate. Further, end faces for connection of the case side arms are bent to form connecting portions, and two adjacent connecting portions are snap-fitted to fix the adjacent case side arms to each other. As the end faces for connection of the case side arms are bent to form the connecting portions and the two adjacent connecting portions can be snap-fitted when the junctions between the case side arms are fixed, the adjacent case side arms can be fixed to each other only by engaging the adjacent connecting portions of the case side arms, such that it is easy to operate and no welding is needed, which simplifies the production process and improves the work efficiency. Further, as the case side arms each are formed by bending each of the extensions, and the extension is formed by extending horizontally outward along the bottom plate, that is, the case side arms are formed integrally with the bottom plate, the structural strength of the whole battery case is increased.

In a second aspect, the present application further provides a battery case, including:

a bottom plate;

a plurality of extensions circumferentially spaced formed by extending horizontally outward along the bottom plate, each of the extensions is bent at least once to form a case side arm and a cavity of the battery case is enclosed by the case side arms and the bottom plate, and end faces for connection of the case side arms are provided with connecting portions, and two adjacent connecting portions are folded over one another to fix the adjacent case side arms to each other.

The present application has the beneficial effects as follows.

The battery case provided according to the second aspect of the present application has the same advantages as the battery case provided according to the first aspect, and will not be described in detail herein again.

In a third aspect, the present application provides a battery module including a plurality of battery cells stacked together and a battery case described in the first aspect or the second aspect, the plurality of battery cells stacked together are accommodated inside the cavity of the battery case and are clamped between the pressing members and the bottom plate.

The present application has the beneficial effects as follows.

The battery module provided according to the third aspect of the present application has the same advantages as the battery case provided according to the first aspect and the second aspect, and will not be described in detail herein again.

BRIEF DESCRIPTION OF DRAWINGS

In order to more clearly illustrate the detailed description of embodiments of the present application or the technical solutions of the prior art, the drawings required for the description of the embodiments or the prior art will be described briefly below. Obviously, the drawings in the following description are only some of the embodiments of the present application, and those of ordinary skill in the art would also be able to obtain other drawings from these drawings without expending any inventive effort.

LIST OF REFERENCE NUMERALS

1—Bottom plate;
a—Extension;
2—case side arm;
  21—End plate;
    211—First connecting portion;
    212—Reinforcing arm;
      2121—First connecting hole;
      2122—Reinforcing portion;
  22—Side plate;
    221—Second connecting portion;
    222—Bent arm;
      2221—Second connecting hole;
      2222—Bent portion;
    223—Pressing member;
3—Support.

DESCRIPTION OF EMBODIMENTS

The technical solution of the present application will be clearly and completely described with reference to the drawings. Obviously, the described embodiments are some of, rather than all of, the embodiments of the present application. All the other embodiments obtained by those of ordinary skill in the art based on the embodiments of the present application without any inventive efforts shall fall within the scope of protection of the present application.

It should be noted that the terms that indicate orientation or positional relationships, such as "inner" and "outer", are based on the orientation or position relationships shown in the figures and are intended to facilitate the description of the present application and simplify the description only, rather than indicating or implying that an apparatus or element referred to must have a particular orientation or be constructed and operated in a particular orientation, and hence will not to be understood to limit the present application.

In the description of the present application, it should be noted that unless otherwise explicitly specified and defined, the terms "mounting", "connecting" and "connection" should be understood in a broad sense, for example, they may be a fixed connection, a detachable connection, or an integrated connection; may be a mechanical connection or be an electrical connection; may be a direct connection or an indirect connection via an intermediate medium, or may be communication between the interiors of two elements. For those of ordinary skill in the art, the specific meaning of the above terms in the present application may be understood according to specific circumstances.

Figure 2:
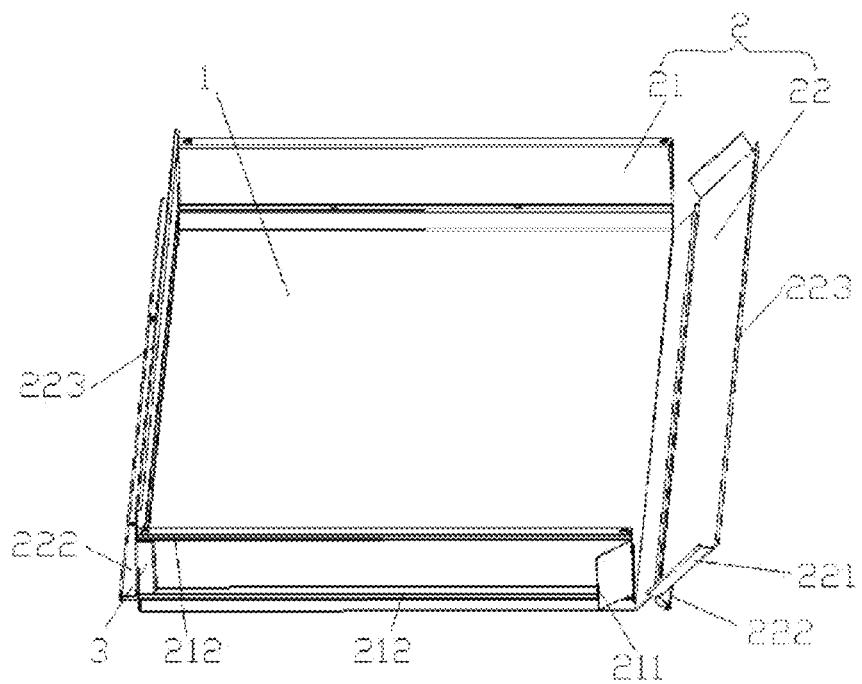
FIG. 2 is a schematic structural diagram of end plates and side plates provided according to the embodiment I of the present application before fastening.
Figure 3:
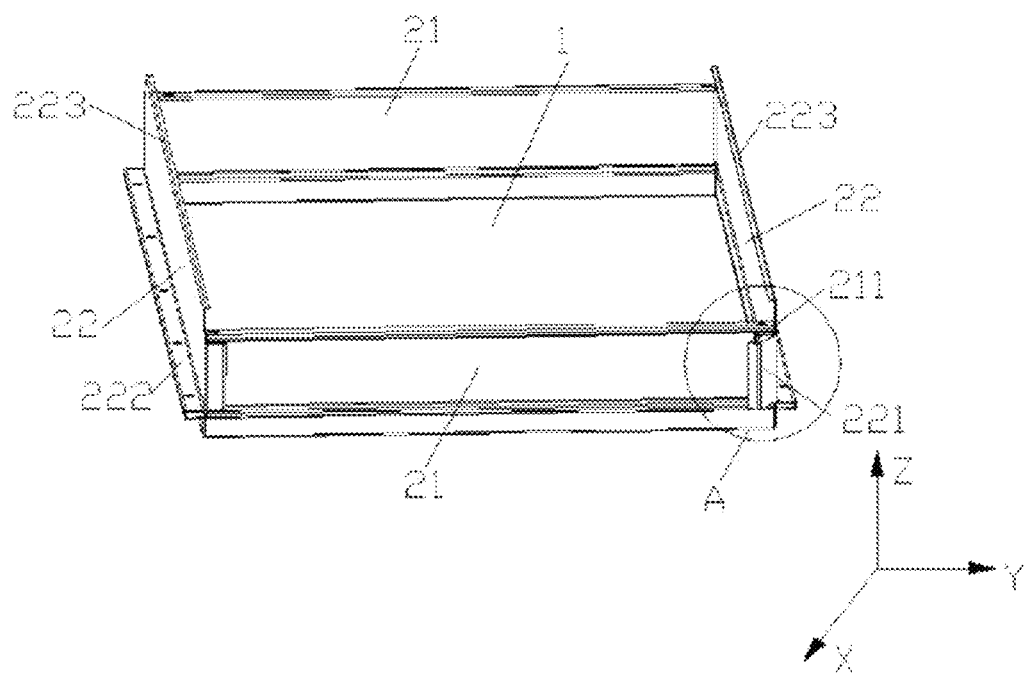
FIG. 3 is a schematic structural diagram of the end plates and the side plates provided according to the embodiment I of the present application during fastening.
Figure 4:
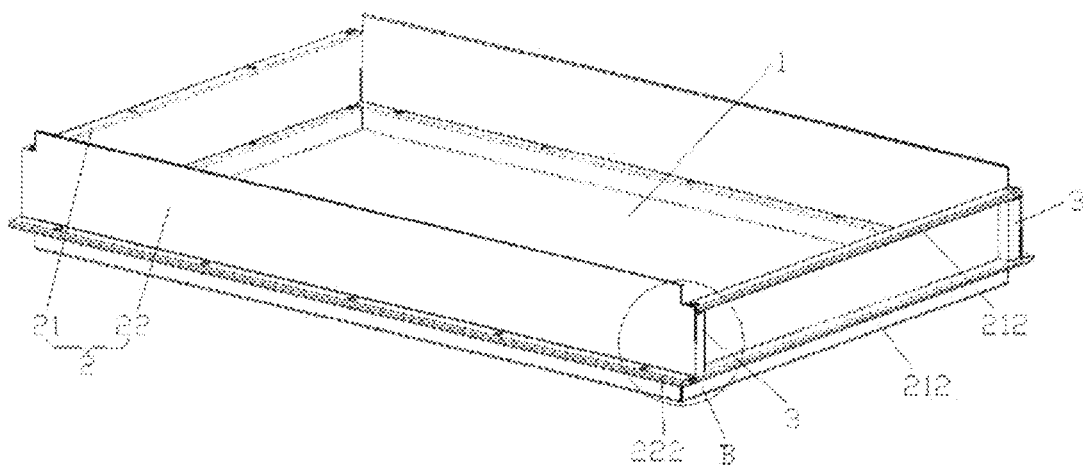
FIG. 4 is a schematic structural diagram of the end plates and the side plates provided according to the embodiment I of the present application after fastening.

Specifically, a battery module includes a battery case and a plurality of battery cells located in the battery case. As shown in FIGS. 2, 3 and 4, in this embodiment, the battery case includes a bottom plate 1 and a plurality of circumferentially spaced extensions a, and the extensions a are formed by extending horizontally outward along the bottom plate 1, specifically, each extensions a is bent at least once to form a case side arm 2, and a cavity of the battery case are enclosed by the case side arms 2 and the bottom plate 1. Further, end faces for connection of the case side arms 2 are bent to form connecting portions, and two adjacent connecting portions are snap-fitted to fix the adjacent case side arms 2 to each other. As the end faces for connection of the case side arms 2 are bent to form the connecting portions and the two adjacent connecting portions can be snap-fitted when the junctions between the case side arms 2 are fixed, the adjacent case side arms 2 can be fixed to each other only by engaging the adjacent connecting portions of the case side arms 2, such that it is easy to operate and no welding is needed, which simplifies the production process and improves the work efficiency. Further, as the case side arms 2 each are formed by bending each of the extensions a, and the extension a is formed by extending horizontally outward along the bottom plate 1, that is, the case side arms 2 are formed integrally with the bottom plate 1, the structural strength of the whole battery case is increased.

The material from which the battery case is made may be an aluminum material, a steel material or the like, In order to further increase the overall strength of the battery case and ensure that the battery case has good ductility, the material from which in some embodiments the battery case is a steel material in this embodiment.

Figure 1:
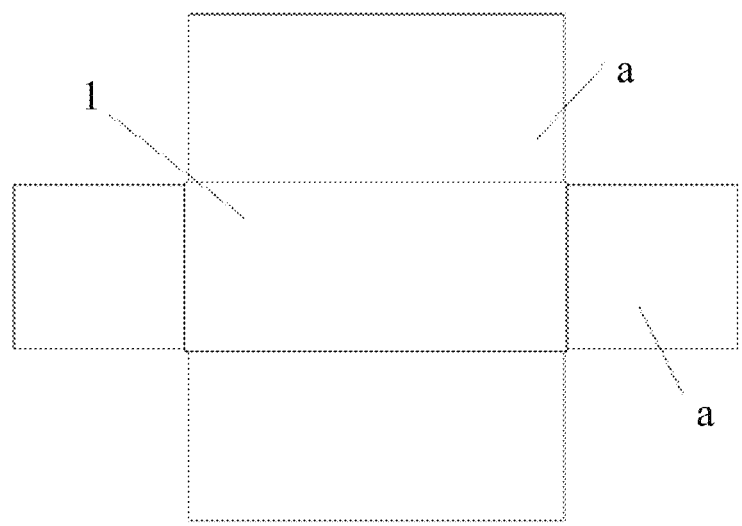
FIG. 1 is a schematic structural diagram of a bottom plate provided according to an embodiment I of the present application.

As shown in FIG. 1, the connecting portions include first connecting portions 211 and a second connecting portions 221, in particular, the case side arms 2 includes at least two end plates 21 and at least two side plates 22, and an end plate 21 is arranged between two adjacent side plates 22. In this embodiment, in order to ensure that the extensions a can be bent to form a closed case side arm 2, three, four, five, six or more extensions a may be provided, and for ease of processing and placement of the battery cells, four extensions a are preferred, the bottom plate 1 in some embodiments is a rectangular plate. Further, four side end faces of the bottom plate 1 extend to form four extensions a.

As shown in FIGS. 2 and 3, specifically, in this embodiment, when the battery case is processed, three of the extensions a can be first bent by 90 degrees along the same bending path, the remaining extension a can be pre bent by 45 degrees, such that the end plates 21 and the side plates 22 are formed by bending, a plurality of battery cells for making up the battery module are then placed into the enclosed case cavity, and then the pre bent extension a is bent to a position where the side plates 22 or the end plates 21 adjacent to the extensions provide an enclosure, i.e., being bend by further 45 degrees.

Figure 6:
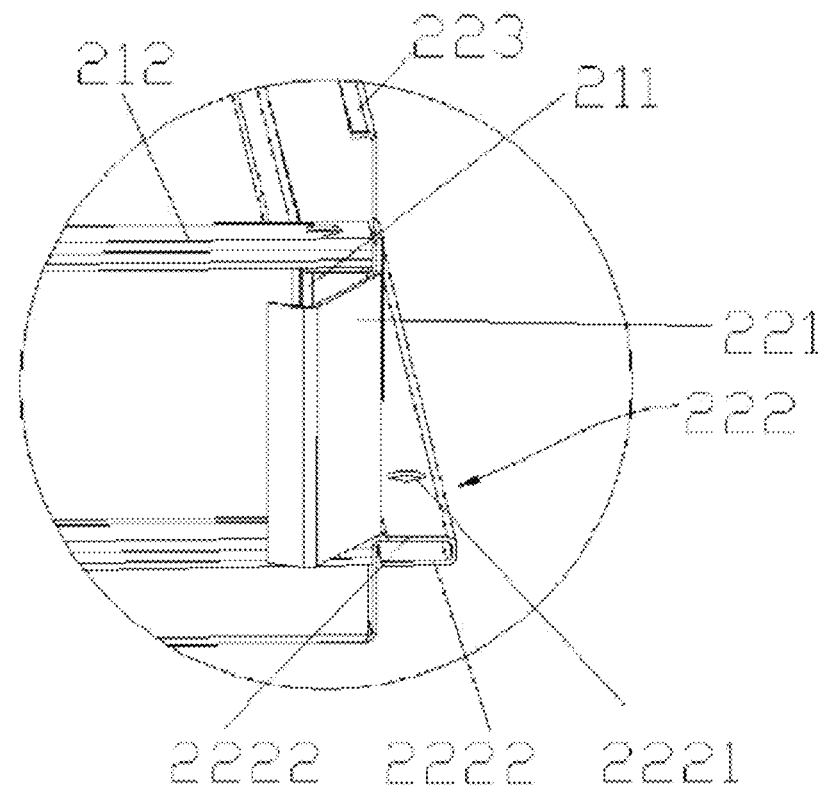
FIG. 6 is an enlarged view of the portion A in FIG. 3.

As shown in FIGS. 3 and 6, further, in this embodiment, the end faces for connection of the end plates 21 are bent to form the first connecting portions 211, the end faces for connection of the side plates 22 are bent to form the second connecting portions 221, and the adjacent first connecting portion 211 and second connecting portion 221 are snap-fitted together. In the designed structure, the end plates 21 and the side plates 22 adjacent to each other are fixed by engaging the first connecting portions 211 with the second connecting portions 221, such that it is easy to operate and welding is eliminated.

As shown in FIG. 6, in order to engage the first connecting portions 211 with the second connecting portions 221, the end plates 21 and the side plates 22 are both bent along the same path each time. When the first connecting portions 211 are snap-fitted and fitted with the second connecting portions 221, one of the first connecting portions 211 and the second connecting portions 221 that is located on the outer side are fastened to one of the first connecting portions and the second connecting portions that is located on the inner side for engagement by form-fitting.

As shown in FIGS. 2, 3, 4 and 5, further, the first connecting portions 211 and the second connecting portions 221 may be located inside the cavity of the battery case. In this embodiment, in order to increase the energy density and prevent the first connecting portions 211 and the second connecting portions 221 from occupying the space in the battery case, in some embodiments, both the first connecting portions 211 and the second connecting portions 221 to be located outside the cavity of the battery case.

It should be additionally explained herein that FIG. 2 shows a state in which the first connecting portions 211 and the second connecting portions 221 are not bent yet. In the state illustrated, the first connecting portions 211 and the second connecting portions 221 may be directly folded over one another, or a structure in which the first connecting portions 211 and the second connecting portions 221 can be fastened together as shown in FIG. 3 may also be obtained by bending.

As shown in FIGS. 2, 3, 4 and 5, in this embodiment, in order to further increase the structural strength of the end plates 21 and thus the overall structural strength of the battery case, the end plates 21 are bent to form at least one reinforcing arm 212. The reinforcing arms 212 may be arranged in the length direction (Y-axis) of the end plates 21 or in the height direction (Z-axis) of the end plates 21. In order to increase the structural strength of the end plates 21 and further reduce or even avoid the deformation of the end plates 21 caused by the expansion of the battery cells, in some embodiments, the reinforcing arms 212 to be arranged parallel to the bottom plate 1.

Further, In addition to that the reinforcing arms 212 are capable of increasing the structural strength of the end plates 21, connecting members may pass through the reinforcing arms 212 and are connected to the case of the battery pack to fix the battery case to the case of the battery pack, providing connection fixing points for the battery case.

Continuing referring to FIGS. 2, 3, 4 and 5, the reinforcing arms 212 may be located outside the cavity structure of the battery case or may be located inside the cavity structure of the battery case. In this embodiment, in order to increase the energy density and prevent the reinforcing arms 212 from occupying the space in the battery case, in some embodiments the reinforcing arms 212 to be located outside the cavity of the battery case.

In the figures, one, two, three, four or more reinforcing arms 212 may be provided. In this embodiment, in order to be able to reduced or even prevent the deformation of the end plates 21 caused by the expansion of the battery cells and also to simplify the processing procedures, two reinforcing arms 212 in some embodiments are provided, and the two reinforcing arms 212 are located on the top and bottom of the end plate 21.

Further, the top and bottom of the end plate 21 may be bent several times to form the reinforcing arms 212. In this embodiment, in order to simplify the processing procedures and also to be able to increase the structural strength of the end plate 21, the top and bottom of the end plate 21 are respectively bent twice to form the reinforcing arms 212.

Figure 5:
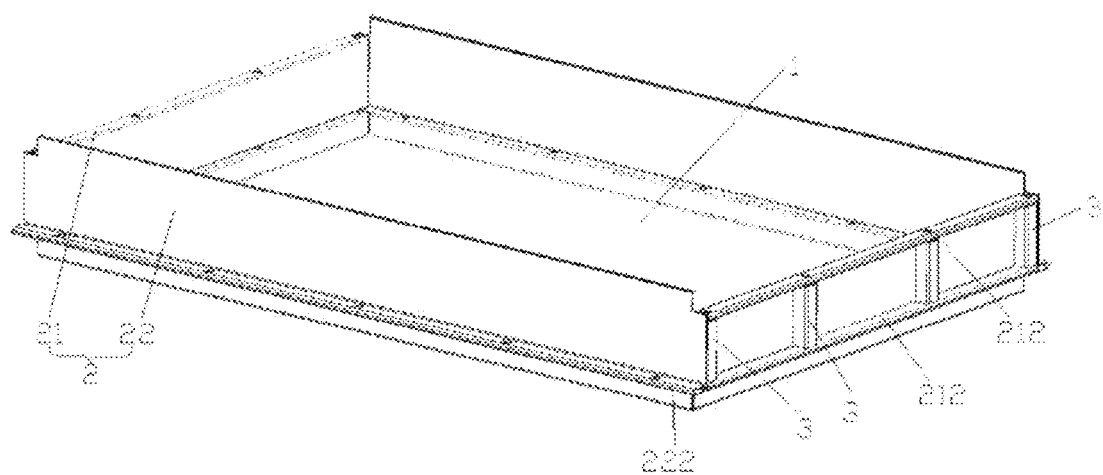
FIG. 5 is a schematic structural diagram of a battery case with a plurality of supports provided according to the embodiment I of the present application.

As shown in FIGS. 4 and 5, when the case is fixed, the connecting members need to pass through the reinforcing arms 212 and then are connected to the case of the battery pack. During this process, the connecting members can generate a preload force in the height direction (Z-axis) of the battery case. In order to avoid the deformation of the reinforcing arms 212 caused by the preload force and thus the impact on the structural strength of the end plates 21 as well as on the stability of the connection between the end plates 21 and the side plates 22, in this embodiment, adjacent first connecting portion 211 and second connecting portion 221 are snap-fitted to form at least one support 3. The support 3 abuts between two reinforcing arms 212, that is, both the upper and lower end faces of the support 3 are in contact with the two upper and lower reinforcing arms 212, such that the support 3 can provide a force in a direction opposite to the preload force to reduce or even prevent the deformation of the reinforcing arms 212.

Continuing to refer to FIGS. 4 and 5, it should be noted herein that the supports 3 at both ends of the end plate 21 are formed after the first connecting portions 211 and the second connecting portions 221 are snap-fitted, and the supports 3 located at other positions on the end plate 21 may be formed by bending the end plate 21 itself or by engaging the first connecting portions 211 with the second connecting portions 221.

Figure 7:
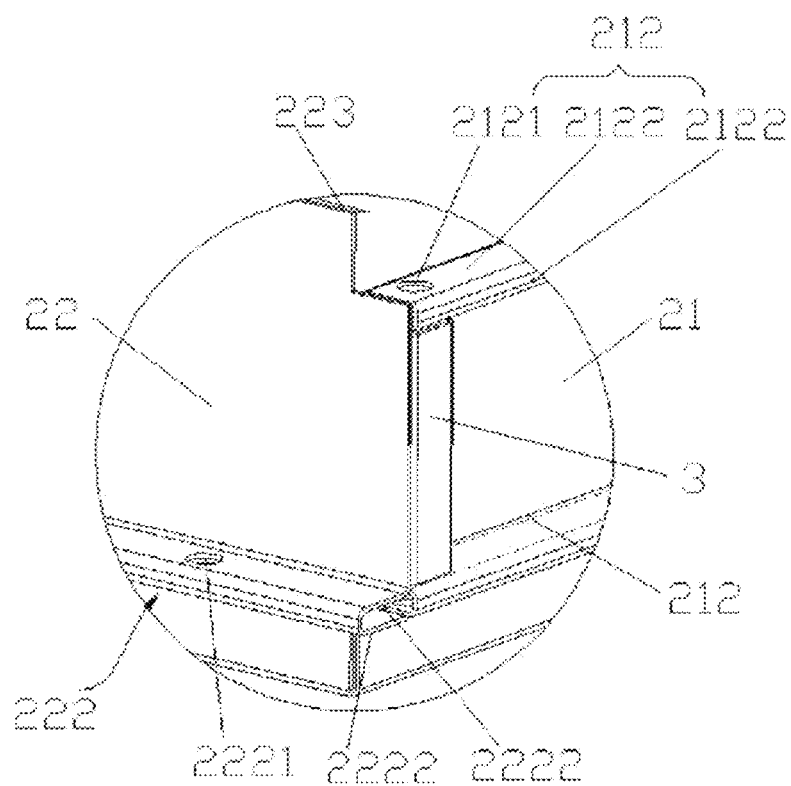
FIG. 7 is an enlarged view of the portion B in FIG. 4.

As shown in FIGS. 6 and 7, the end plate 21 may be bent one or more times to form the reinforcing arms 212. In order to further increase the deformation resistance of the reinforcing arms 212, improve the firmness of the connection of the battery case to the case of the battery pack, and to reduce the processing procedures, in this embodiment, the end plate 21 is bent twice to form the reinforcing arms 212. Specifically, the reinforcing arms 212 each include two reinforcing portions 2122 arranged opposite one another. The two reinforcing portions 2122 are each provided with a plurality of second connecting holes 2221 corresponding to one another, and the reinforcing portions 2122 are connected to the case of the battery pack by the connecting members passing through the second connecting holes 2221.

Further, in this embodiment, in order to improve the firmness of the connection of the battery case to the case of the battery pack, the side plate 22 is bent to form at least one bent arm 222, and the bent arm 222 is arranged parallel to the bottom plate 1. Specifically, the bent arm 222 is provided with the second connecting holes 2221, and the bent arm 222 is connected to the case of the battery pack by the connecting members passing through the second connecting holes 2221.

The bent arm 222 may be located inside the cavity of the battery case. In order to increase the energy density and prevent the bent arm 222 from occupying the space in the battery case, the bent arm 222 is located outside the cavity of the battery case. Further, As shown in FIGS. 2, 3, 4 and 5, in this embodiment, the arrangement of both the bent arm 222 and the reinforcing arms 212 outside the cavity of the battery case can also avoid passage of the connecting members through the bottom plate 1 when the batter case is connected to the case of the battery pack, which in turn ensures the integrity of the battery case and increases the overall structural strength.

As shown in FIGS. 6 and 7, the side plate 22 may be bent one or more times to form the bent arms 222. In order to improve the firmness of the connection of the battery case to the case of the battery pack and to reduce the processing procedures, in this embodiment, the side plate 22 is bent twice to form the bent arms 222. Specifically, the bent arms 222 each include two reinforcing portions 2222 arranged opposite one another, and the two bent portions 2222 are each provided with a plurality of the second connecting holes 2221 corresponding to one another.

The top of the side plate 22 may be not bent. In order to improve the stability of the battery cells in the battery case, in this embodiment, the end face, facing away from the bottom plate 1, of the side plate 22 extends outward to form pressing members 223, the pressing members 223 are located inside the cavity of the battery case, and the battery cells are clamped between the pressing members 223 and the bottom plate 1.

This embodiment further provides another structure of a battery case. The battery case includes a bottom plate 1 and a plurality of the circumferentially spaced extensions a, and the plurality of extensions a are formed by extending horizontally outward along the bottom plate 1, particularly each extension a is bent at least once to form a case side arm 2, and a cavity of the battery case are enclosed by the case side arms 2 and the bottom plate 1. Further, end faces for connection of the case side arms 2 are provided with connecting portions, and the two adjacent connecting portions are folded over one another to fix the adjacent case side arms 2 to each other.

The structure of the battery case provided in this embodiment has the same advantages as the battery case described in the embodiment I, which have been explicitly described above, and will not be described in detail herein again.

Figure 8:
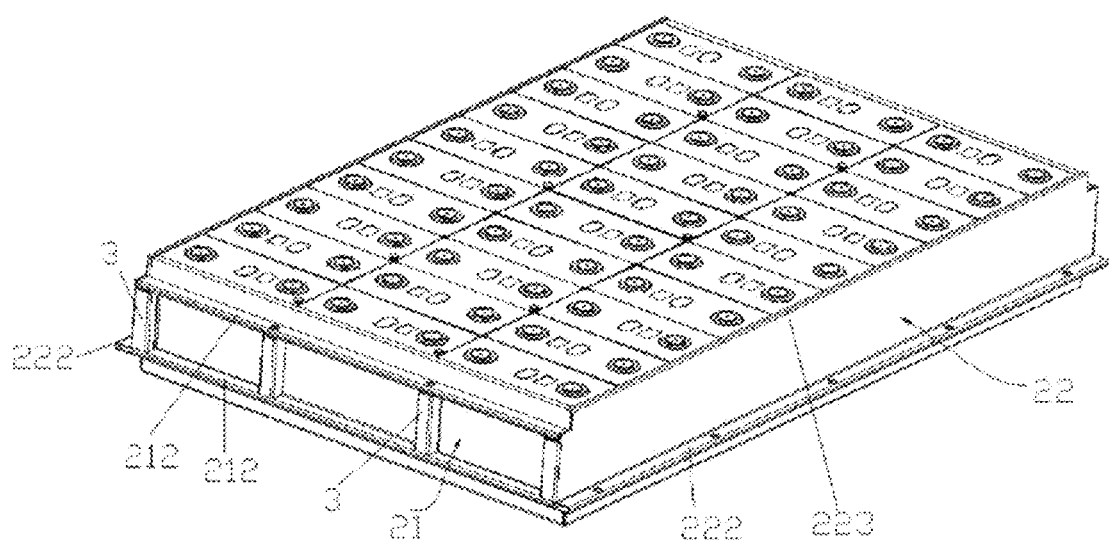
FIG. 8 is a schematic structural diagram of the battery case with battery cells assembled therein provided according to an embodiment III of the present application.

As shown in FIG. 8, a battery module is provided in this embodiment and includes a plurality of battery cells stacked together and a battery case in the embodiment I and the embodiment II described above, and the plurality of battery cells stacked together are accommodated inside a cavity of the battery case and clamped between the pressing members 223 and the bottom plate 1.

The battery module has the same advantages as the battery case described in the embodiment I and the embodiment II described above, which have been explicitly described above, and will not be described in detail herein again.

Finally, it should be noted that the above embodiments are merely used for illustrating rather than limiting the technical solutions of the present application; although the present application is illustrated in detail with reference to the foregoing embodiments, those of ordinary skill in the art should understand that modifications may still be made to the technical solutions recorded in the foregoing embodiments or equivalent replacements on some or all of the technical features thereof may be made; and these modifications or replacements will not make the essential of corresponding technical solutions depart from the scope of the technical solutions in various embodiments of the present application.

What is claimed is:

1. A battery case comprising:
   a bottom plate; and
   a plurality of extensions circumferentially spaced, the plurality of extensions being formed by extending horizontally outward along the bottom plate,
   wherein each of the plurality of extensions is bent at least once to form a case side arm and a cavity of the battery case is enclosed by the case side arms and the bottom plate, and
   wherein end faces for connection of the case side arms are bent to form connecting portions, and two adjacent connecting portions are snap-fitted to fix the adjacent case side arms to each other;
   wherein:
   the connecting portions comprise first connecting portions and second connecting portions;
   the case side arms comprise:
      at least two end plates, end faces for connection of the at least two end plates being bent to form the first connecting portions; and at least two side plates, an end plate being arranged between the adjacent side plates, end faces for connection of the at least two side plates being bent to form the second connecting portions;

adjacent first connecting portion and second connecting portion are snap-fitted together; and the end faces, facing away from the bottom plate, of the side plates extend outward to form pressing members, and the pressing members are located inside the cavity of the battery case.

2. The battery case according to claim 1, wherein the at least two end plates are bent to form at least one reinforcing arm, and the at least one reinforcing arm is arranged parallel to the bottom plate; and the at least one reinforcing arm is located outside the cavity of the battery case.

3. The battery case according to claim 2, wherein the number of the at least one reinforcing arms is two, the adjacent first connecting portion and second connecting portion are snap-fitted to form at least one support, and the support abuts between two reinforcing arms.

4. The battery case according to claim 2, wherein the at least one reinforcing arm comprises two reinforcing portions arranged opposite one another, and the two reinforcing portions are both provided with a plurality of first connecting holes corresponding to one another; and the at least one reinforcing arm is connected to a case of a battery pack by a connecting member passing through the first connecting holes.

5. The battery case according to claim 1, wherein the side plates are bent to form at least one bent arm, the at least one bent arm is arranged parallel to the bottom plate, and the at least one bent arm is located outside the cavity of the battery case; and the at least one bent arm is provided with a second connecting hole, and the at least one bent arm is connected to a case of a battery pack by a connecting member passing through the second connecting hole.

6. The battery case according to claim 5, wherein the at least one bent arm comprises:

two bent portions arranged opposite one another, the two bent portions being both provided with a plurality of second connecting holes corresponding to one another.

7. A battery module comprising:

a plurality of battery cells stacked together and a battery case;

wherein the plurality of battery cells stacked together are accommodated inside a cavity of the battery case and are clamped between pressing members and the bottom plate;

the battery case comprising:

a bottom plate; and a plurality of extensions circumferentially spaced, the plurality of extensions being formed by extending horizontally outward along the bottom plate, wherein each of the plurality of extensions is bent at least once to form a case side arm and the cavity of the battery case is enclosed by the case side arms and the bottom plate, and wherein end faces for connection of the case side arms are bent to form connecting portions, and two adjacent connecting portions are snap-fitted to fix the adjacent case side arms to each other.

8. The battery module according to claim 7, wherein the connecting portions comprise first connecting portions and second connecting portions;

the case side arms comprise:

at least two end plates, end faces for connection of the at least two end plates being bent to form the first connecting portions; and at least two side plates, an end plate being arranged between adjacent side plates, end faces for connection of the at least two side plates being bent to form the second connecting portions; and adjacent first connecting portion and second connecting portion are snap-fitted together.

9. The battery module according to claim 8, wherein the at least two end plates are bent to form at least one reinforcing arm, and the at least one reinforcing arm is arranged parallel to the bottom plate; and the at least one reinforcing arm is located outside the cavity of the battery case.

10. The battery module according to claim 9, wherein the number of the at least one reinforcing arms is two, the adjacent first connecting portion and second connecting portion are snap-fitted to form at least one support, and the support abuts between two reinforcing arms.

11. The battery module according to claim 9, wherein the at least one reinforcing arm comprises two reinforcing portions arranged opposite one another, and the two reinforcing portions are both provided with a plurality of first connecting holes corresponding to one another; and the at least one reinforcing arm is connected to a case of a battery pack by a connecting member passing through the first connecting holes.

12. The battery module according to claim 8, wherein the side plates are bent to form at least one bent arm, the at least one bent arm is arranged parallel to the bottom plate, and the at least one bent arm is located outside the cavity of the battery case, and the at least one bent arm is provided with a second connecting hole, and the at least one bent arm is connected to a case of a battery pack by a connecting member passing through the second connecting hole.

13. The battery module according to claim 12, wherein the at least one bent arm comprises:

two bent portions arranged opposite one another, the two bent portions being both provided with a plurality of second connecting holes corresponding to one another.

14. The battery module according to claim 8, wherein the end faces, facing away from the bottom plate, of the side plates extend outward to form pressing members, and the pressing members are located inside the cavity of the battery case.

15. A vehicle comprising:

a battery module, wherein the battery module comprises a plurality of battery cells stacked together and a battery case, wherein the plurality of battery cells stacked together are accommodated inside a cavity of the battery case and are clamped between pressing members and the bottom plate, the battery case comprising:

a bottom plate; and a plurality of extensions circumferentially spaced, the plurality of extensions being formed by extending horizontally outward along the bottom plate, wherein each of the plurality of extensions is bent at least once to form a case side arm and the cavity of the battery case is enclosed by the case side arms and the bottom plate, and wherein end faces for connection of the case side arms are bent to form connecting portions, and two adjacent connecting portions are snap-fitted to fix the adjacent case side arms to each other.

* * * * *